(12) United States Patent
Armangau et al.

(10) Patent No.: US 9,026,737 B1
(45) Date of Patent: May 5, 2015

(54) ENHANCING MEMORY BUFFERING BY USING SECONDARY STORAGE

(75) Inventors: Philippe Armangau, Acton, MA (US); Jean-Pierre Bono, Westboro, MA (US); Daniel J. Byron, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 980 days.

(21) Appl. No.: 13/172,610

(22) Filed: Jun. 29, 2011

(51) Int. Cl.
*G06F 12/00* (2006.01)
*G06F 12/08* (2006.01)

(52) U.S. Cl.
CPC .................. *G06F 12/0822* (2013.01)

(58) Field of Classification Search
USPC .................................. 711/136, 118
See application file for complete search history.

(56) References Cited

U.S. PATENT DOCUMENTS 5,875,201 A * 2/1999 Bauman et al. ............... 714/800

* cited by examiner

*Primary Examiner* — Reginald Bragdon
*Assistant Examiner* — Hamdy S Ahmed
(74) *Attorney, Agent, or Firm* — Deepika Bhayana; Jason A. Reyes; Krishnendu Gupta

(57) ABSTRACT

A method is used in enhancing memory buffering by using secondary storage. A buffer cache pool is supplemented with a secondary storage. A portion of a volatile memory of a data storage system is reserved as the buffer cache pool. The buffer cache pool includes a set of buffer cache objects for storing file system data and metadata. The secondary storage includes a set of data blocks. A first buffer cache object of the set of buffer cache objects is aged out by copying contents of the buffer cache object to a data block of the secondary storage. Contents of the first buffer cache object are retrieved from the secondary storage by copying contents of the data block of the secondary storage to a second buffer cache object of the set of buffer cache objects of the buffer cache pool.

20 Claims, 12 Drawing Sheets

ENHANCING MEMORY BUFFERING BY USING SECONDARY STORAGE

BACKGROUND

1. Technical Field

This application relates to enhancing memory buffering by using secondary storage.

2. Description of Related Art

Computer systems may include different resources used by one or more host processors. Resources and host processors in a computer system may be interconnected by one or more communication connections. These resources may include, for example, data storage devices such as file servers and those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance. File system accesses may be serviced from the buffer cache rather than read from the disk, thereby saving the delay associated with disk I/O access and increasing performance of the data storage system.

One of the functions of the operating system of a data storage system is to allocate pages to applications. The operating system maintains a 'free list', which is a list of pages that are available for allocation to applications. When an application requires one or more pages, the operating system may allocate a page from either the free list or preempt a page from the buffer cache. When client applications no longer need pages, they are returned to the free list.

The performance of applications is heavily influenced by the speed with which an application can retrieve data. As such, it is important to cache as much data as possible to improve performance of the data storage system.

SUMMARY OF THE INVENTION

A method is used in enhancing memory buffering by using secondary storage. A buffer cache pool is supplemented with a secondary storage. A portion of a volatile memory of a data storage system is reserved as the buffer cache pool. The buffer cache pool includes a set of buffer cache objects for storing file system data and metadata. The secondary storage includes a set of data blocks. A first buffer cache object of the set of buffer cache objects is aged out by copying contents of the buffer cache object to a data block of the secondary storage. Contents of the first buffer cache object are retrieved from the secondary storage by copying contents of the data block of the secondary storage to a second buffer cache object of the set of buffer cache objects of the buffer cache pool.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
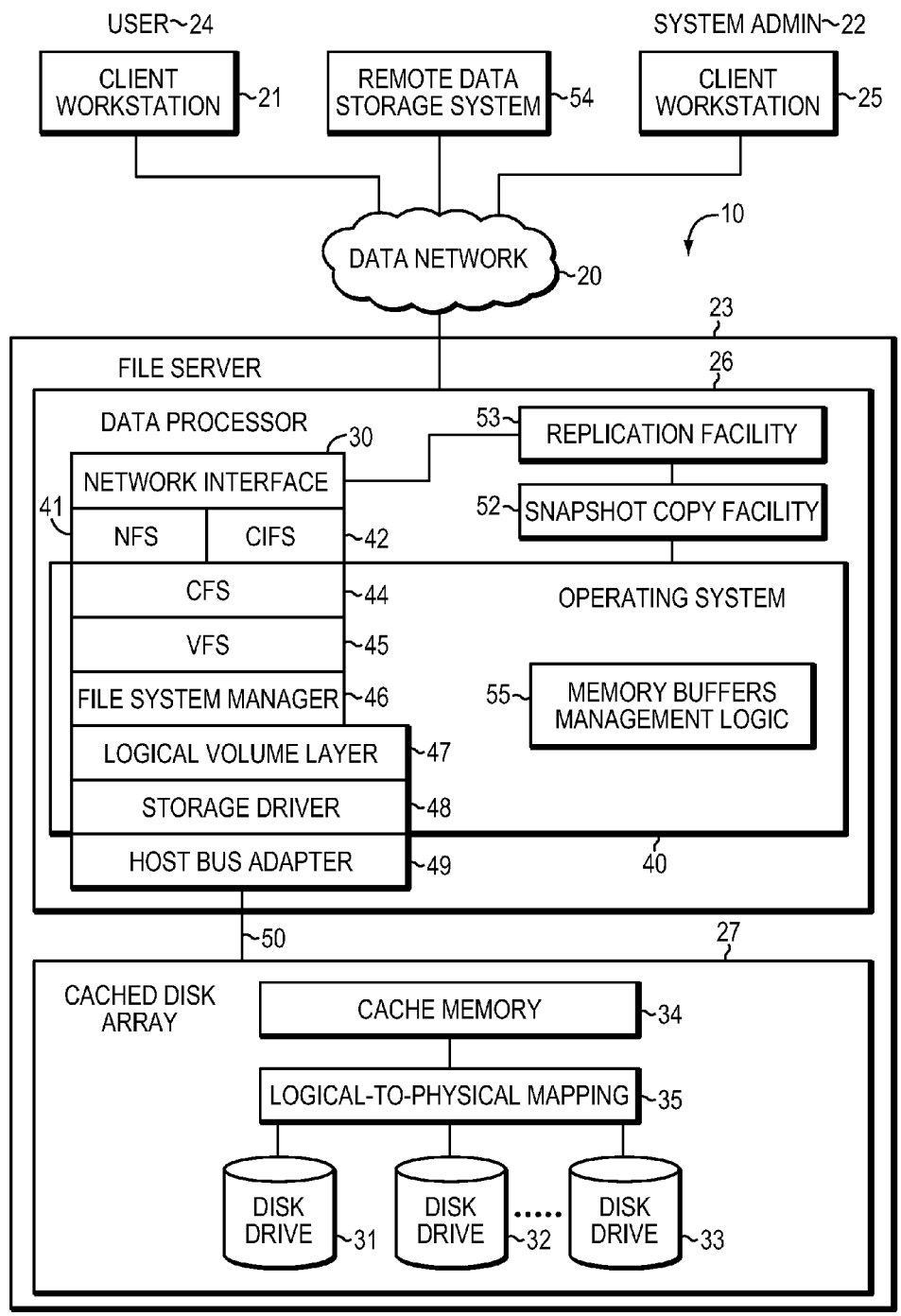
FIGS. 1-2 are an example of an embodiment of a computer system that may utilize the techniques described herein.

Described below is a technique for use in enhancing memory buffering by using secondary storage, which technique may be used to provide, among other things, supplementing a buffer cache pool with a secondary storage, aging out buffer cache objects of the buffer cache pool by copying contents of the buffer cache objects to data blocks of the secondary storage, and retrieving contents previously stored in the buffer cache objects from the secondary storage by copying contents of the data blocks of the secondary storage to buffer cache objects of the buffer cache pool.

Generally, a file system data that is read from disks and written to disks is cached in a volatile memory of a data storage system. Caching of the file system data implies that read operations read the file system data from the volatile memory, rather than from a physical disk. Correspondingly, write operations may write the file system data to the volatile memory rather than to the disk. Further, a file system data may include metadata of files of the file system and contents of the files. A buffer cache pool is created from a portion of a volatile memory of a data storage system where the portion of the volatile memory is apportioned into buffer cache objects (also referred to as "buffer cache page" or "buffer cache block") in such a way that each buffer cache object is represented by a buffer cache descriptor. The buffer cache pool provides buffer cache blocks to applications for storing data and/or metadata of a file system. The buffer cache pool manages allocation, caching and deallocation of buffer cache blocks by adding the buffer cache blocks to any one of queues (or lists) managed by the buffer cache pool. The buffer cache pool caches metadata of a file system which includes directory contents, file status information (e.g., access time, last modification time, size, permission bits), and file system structures (such as indirect blocks, inode, cylinder group blocks and per-block metadata).

Generally, data and/or metadata of a file system is referred to and updated frequently, thus caching data and/or metadata of the file system in a volatile memory of a data storage system improves I/O performance of the file system. Thus, an application may access data and/or metadata stored in the volatile memory, thereby avoiding or reducing the need to retrieve data and/or metadata of the file system from a disk. Further, metadata of a file system includes a mapping of a logical address of data of the file system to a physical address of data of the file system. Thus, caching as much data and/or metadata of a file system as possible in a volatile memory of a data storage system increases I/O performance of the file system.

Generally, a mechanism of lists and "hints" is used to manage buffer cache blocks of the buffer cache pool. In a data storage system using the mechanism of lists and hints, a buffer cache block is allocated to store data and/or metadata of a file system so that the file system may access the buffer cache pool to retrieve the data and/or metadata when performing I/O operations on the file system. In such a system, when a buffer cache block that is allocated for storing metadata is released, the buffer cache block is labeled with a revision number, and the buffer cache block is added to a list (or queue) in a least recently used manner. The process of labeling a buffer cache block with a revision number before releasing the buffer cache block is known as creating a "hint" for the buffer cache block. Creating a hint for a buffer cache block enables an application to access information stored in the buffer cache block even after the buffer cache block has been released as long as the buffer cache block has not been reused. Additionally, buffer cache blocks released to the list may be reused to store data and/or metadata of a file system when the buffer cache pool does not have free buffer cache blocks available for allocation. The process of reusing released buffer cache blocks is also known as "recycling", which is performed by removing a buffer cache block from the list in the least recently used manner such that the removed buffer cache block represents the first buffer cache block that has been released to the list compared to other buffer cache blocks existing on the list. Thus, a buffer cache block removed from the list in the least recently used manner represents the oldest buffer cache block on the list that has been referenced by an application. Consequently, the oldest buffer cache block is least likely to be referenced by the application again at a later time. When a buffer cache block is reused from the list in the least recently used manner, the revision number of the buffer cache block is updated to indicate that the hint of the buffer cache block is no longer valid. Thus, in such a case, contents of the buffer cache block may no longer be retrieved by simply accessing the buffer cache block.

Generally, if an application performing I/O operations on a file system requires access to metadata and/or data of the file system stored in a buffer cache block that has been released to a list in the least recently used manner, the application may retrieve the released buffer cache block by using the revision number ("hint") of the buffer cache block. If the buffer cache block has not been recycled (i.e., the hint is deemed valid), the buffer cache block is removed from the least recently used list and provided to the application. However, if the buffer cache block has been recycled, the buffer cache block may not be retrieved at all as the revision of the buffer cache block indicates that the hint created for the buffer cache block is no longer valid, which in turn means that contents (data and/or metadata) of the buffer cache block may have changed.

Conventionally, recycling of buffer cache blocks released to a list in the least recently used manner results in decreased performance of a file system because the data storage system may need to retrieve metadata and/or data of the file system previously stored in recycled buffer cache blocks from a disk. Thus, conventionally, in such a case, frequent recycling of metadata and/or data stored in a volatile memory (such as buffer cache blocks of a buffer cache pool) degrades I/O performance of file systems. Additionally, conventionally in such a case, in order for the data storage system to reduce the number of I/O operations to a disk, the volatile memory must be large enough to cache a large amount of metadata and/or data of a file system. As a result, the volatile memory in such a conventional system consumes a large amount of storage resources. Additionally, in such a conventional system, a data storage system may be constrained to include a volatile memory of limited capacity (e.g. up to few gigabytes), and thus may not be able to store a large amount of metadata.

By contrast, in at least some implementations in accordance with the current technique as described herein, using a secondary storage (e.g. flash memory) for supplementing the buffer cache pool enables recycling of buffer cache blocks of the buffer cache pool to the secondary storage without losing the ability to retrieve contents of the recycled buffer cache blocks. Additionally, in at least some implementations in accordance with the current technique as described herein, using the secondary storage increases the number of hints that may be preserved for buffer cache block, thereby increasing an amount of metadata and/or data that may be cached in a memory of a data storage system. Further, in at least some implementations in accordance with the current technique as described herein, using a flash storage as a secondary storage may enable a data storage system to cache a large amount of metadata (e.g., up to few terabytes) in a memory of the data storage system.

By contrast, in at least some implementations in accordance with the current technique as described herein, the use of the enhancing memory buffering by using secondary storage can provide one or more of the following advantages: reducing an amount of time required to access a file system by efficiently caching metadata of the file system, extending the size of a cache for storing metadata of a file system by supplementing the cache with a secondary storage, increasing performance of a file system by increasing the amount of metadata that may be cached in a memory, reducing the number of disk I/Os by storing a large amount of metadata in a secondary storage.

Referring now to FIG. 1, shown is an example of an embodiment of a data storage system that may be used in connection with performing the technique or techniques described herein. The data storage system 10 includes a data network 20 interconnecting clients 21, 25 and servers such as a network file server 23 (also referred to simply as "file server") and a remote data storage system 54. The data network 20 may include any one or more of network connection technologies, such as Ethernet, and communication protocols, such as TCP/IP. The clients 21, 25 for example, are workstations such as personal computers. The workstations are operated by users 24, 22 The user 22 is a system administrator having sufficient privileges for configuring the network file server 23 and for receiving status and error messages from the network file server. Clients 21, 25 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 27. The data processor 26, for example, is a commodity computer. The cached disk array 27 includes multiple disk drives 31, 32, 33, a high-speed random-access cache memory 34, and logical-to-physical mapping 35 between the cache memory 34 and the disk drives.

The data processor 26 has a network interface 30 for communication of data packets over the data network 20 via a data transmission protocol such as TCP/IP. The data processor 26 is programmed with a Network File System (NFS) module 41 for supporting communication with network clients over the data network 20 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 27. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 27.

Referring again to FIG. 1, the CFS module 44, the VFS module 45, the file system manager 46, the logical volume layer 47, and the storage driver 48 are modules of an operating system program 40. The NFS module 41, and CIFS module 42 are internal application programs supported by the operating system 40. The data processor 26 is programmed with additional internal application programs including a snapshot copy facility 52, and a replication facility 53.

The snapshot copy facility 52 performs a copy-on-first-write to each block in a production volume, in order to save an old version ("before image") of the changed block in a snapshot volume. The replication facility 53, for example, replicates, to the remote data storage system 54, changes between a most recent snapshot copy and the next-most-recent snapshot copy of the production volume. Details regarding such a snapshot copy facility 52 and a replication facility 53 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 20 may be any one or more of a variety of networks or other type of communication connections as known to those skilled in the art. For example, the data network 20 may be the Internet, an intranet, network or other wireless or other hardwired connection(s) by which the clients 21, 25 may access and communicate with the network file server 23, and may also communicate with other components (not shown) that may be included in the network file server 23. Each of clients 21, 25 and the network file server 23 may be connected to the data network 20 by any one of a variety of connections as may be provided and supported in accordance with the type of data network 20.

The processors included in the clients 21, 25 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 25 and the network file server 23 may all be located at the same physical site, or, alternatively, may also be located in different physical locations. Some or all of the connections by which the clients 21, 25 and the network file server 23 may be connected may pass through other communication devices, such as a Connectrix or other switching equipment that may exist such as a phone line, a repeater, a multiplexer or even a satellite.

Each of the clients 21, 25 may perform different types of data operations in accordance with different types of tasks. In the embodiment of FIG. 1, any one of the clients 21, 25 may issue a data request to the network file server 23 to perform a data operation. For example, an application executing on one of the clients 21, 25 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 25 provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single data storage system may be accessed by multiple clients allowing the multiple clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 1 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

In at least one embodiment of the current technique, memory buffers management logic 55 manages allocation of pages from a memory of data storage system 10 where the memory may include a volatile memory and nonvolatile memory module.

Figure 2:
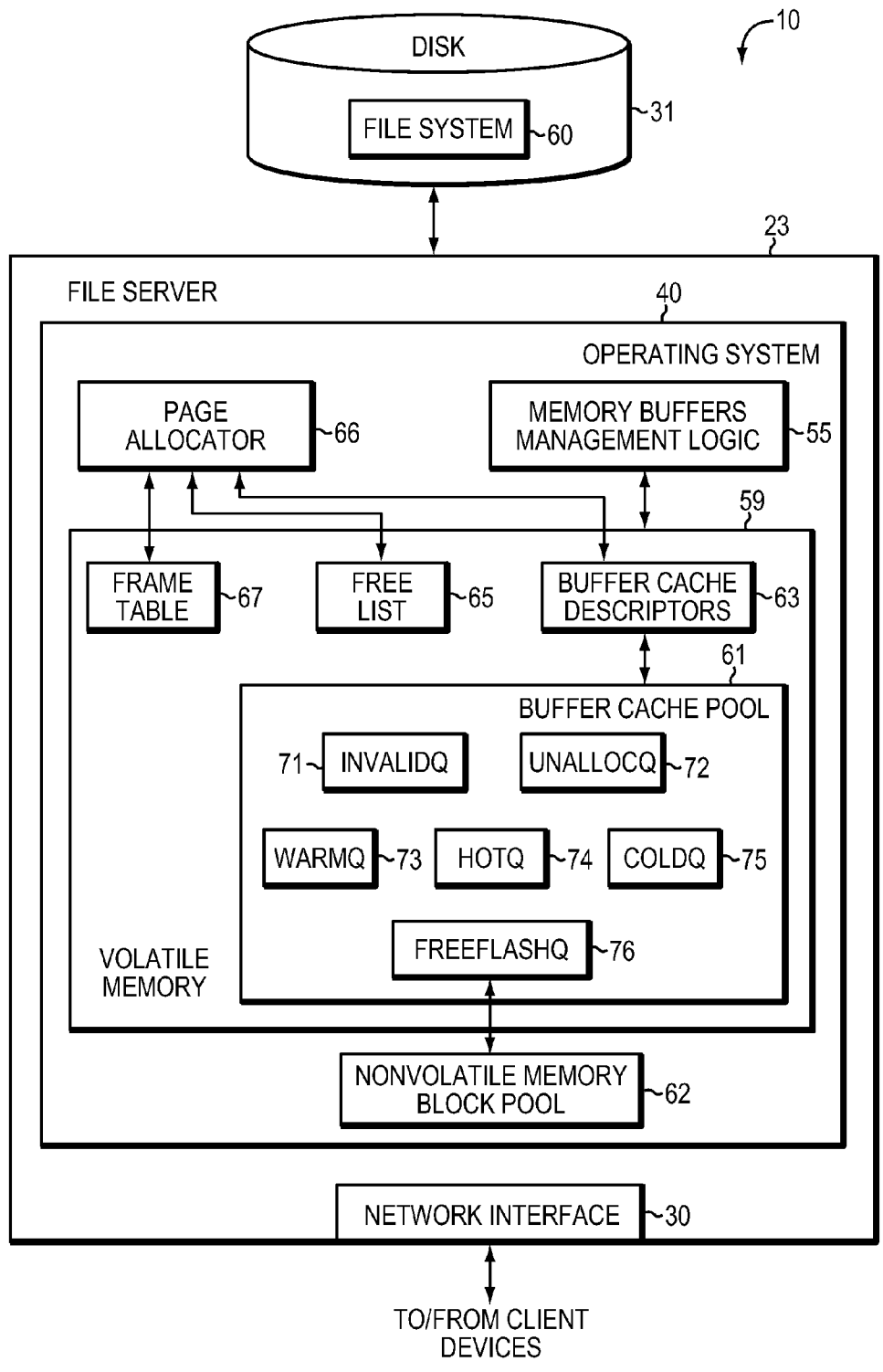

Referring now to FIG. 2, shown is a block diagram of a network file server 23 of FIG. 1 that may be coupled to a storage device 31. The storage device 31 may be, for example, a disk array that stores a file system 60. The file system 60 is generally a data structure that translates the physical (sector) view of a disk into a logical (files, directories) structure, which helps both computers and users locate files. In other words, it records where files and directories are located on the disk.

The storage device is apportioned into fixed size file system blocks, for organizational purposes. Further, the memory of a data storage system is apportioned into fixed size frames, or pages, for organizational purposes. The terms 'frame' and 'page' will be used interchangeably herein. For example, in at least one embodiment of the current technique, the operating system 40 may apportion the memory into pages of 8 kilobytes (KB). Alternatively, in another embodiment of the current technique, the operating system 40 may apportion the memory into pages of 4 kilobytes (KB). Further, in another embodiment of the current technique, the operating system 40 may apportion memory into pages of 4 megabytes (MB). A file system contains a range of file system blocks that store metadata and data. File system blocks are allocated from storage device 31 for creating files and storing metadata of a file system. In at least some embodiments of the current technique, the file system block may be 8 kilobyte (KB) in size. Thus, in at least one embodiment of the current technique, there may exist 1-1 correspondence between a file system block and a page. However, it should be noted that there may not be a 1-1 correspondence between a file system block and a page.

In at least one embodiment of the current technique, file server 23 includes volatile memory module 59 that can be viewed as an array of pages. A first portion of the pages are allocated to data structures that are used to support the operating system 40 of the file server 23. A second portion of the pages are allocated to a buffer cache pool 61, where the buffer cache pool 61 includes a collection of buffer cache blocks such that each buffer cache block may correspond to a page of the volatile memory 59. The remaining pages of volatile memory 59 are so-called 'free' pages available for allocation to applications. The file server 23 communicates with clients coupled to the file server via network interface 30. Clients execute applications which access file systems stored on storage devices via the file server 23.

The file server 23 includes several components that are used to allocate pages from the free list to applications. The components may be implemented as software routines, hardware, or a combination thereof. In FIG. 2, the components that support page allocation are shown to include a page allocator 66, a free list 65 and a frame table 67. The page allocator 66 allocates pages of volatile memory 59 to applications. An application may require one or more pages of memory.

In at least one embodiment of the current technique, buffer cache pool 61 is created by apportioning a portion of volatile memory 59 into buffer cache blocks when operating system 40 of a file server 23 is initialized during a boot sequence. Further, during initialization of operating system 40, a buffer cache descriptor table 63 is created for managing buffer cache blocks of the buffer cache pool 61. The buffer cache descriptor table 63 includes a buffer cache descriptor entry for each buffer cache block created for buffer cache pool 61. A buffer cache descriptor entry associated with a buffer cache block includes information about the buffer cache block. The information may include the physical address of the buffer cache block, as well as an identifier of a buffer cache queue to which the buffer cache block is allocated. The frame table 67 comprises an array of frame table entries. Each frame table entry corresponds to one page in a memory of a data storage system. The frame table 67 includes an ownership field, identifying the owner of the page in memory. Each frame table entry also includes a link to a buffer cache descriptor associated with a page corresponding to the frame table entry. A link to a buffer cache descriptor points to an entry in buffer cache descriptor table 63. In at least one implementation of the current technique, the buffer cache pool 61 comprises six queues, an invalid queue 71 ("invalidQ"), an unalloc queue 72 ("unallocQ"), a warm queue 73 ("warmQ"), a hot queue 74 ("hotQ"), a cold queue 75 ("coldQ"), and a free flash queue 76 ("freeFlashQ"). Although exemplary queues are shown, there is no requirement that any particular queue is provided with the buffer cache pool. Rather it is appreciated that any number and variety of queues may be provided with the buffer cache pool, where each queue is associated with a buffer cache block having a different availability status, ranging from free for pre-emption to unavailable for pre-emption. Memory buffers management logic 55 manages allocation of buffer cache blocks for storing data and/or metadata of a file system.

In at least one embodiment of the current technique, file server 23 includes nonvolatile memory module 62 (e.g. flash memory) that acts as a secondary storage for volatile memory module 59. Nonvolatile memory module 62 supplements buffer cache pool 61 by providing an additional storage space for caching data and/or metadata of a file system. Further, the nonvolatile memory module 62 is apportioned into fixed size data blocks, for organizational purposes, where the size of a data block may be same as the size of a buffer cache block. For example, in at least one embodiment of the current technique, the operating system 40 may apportion the nonvolatile memory into data blocks of 8 kilobytes (KB). Further, in at least one embodiment of the current technique, nonvolatile memory 62 may include a flash memory (e.g. solid state drives, EEPROM (electrically erasable programmable read-only memory)). Memory buffers management logic 55 manages data blocks of nonvolatile memory 62 by using free flash queue 76.

Figure 3:
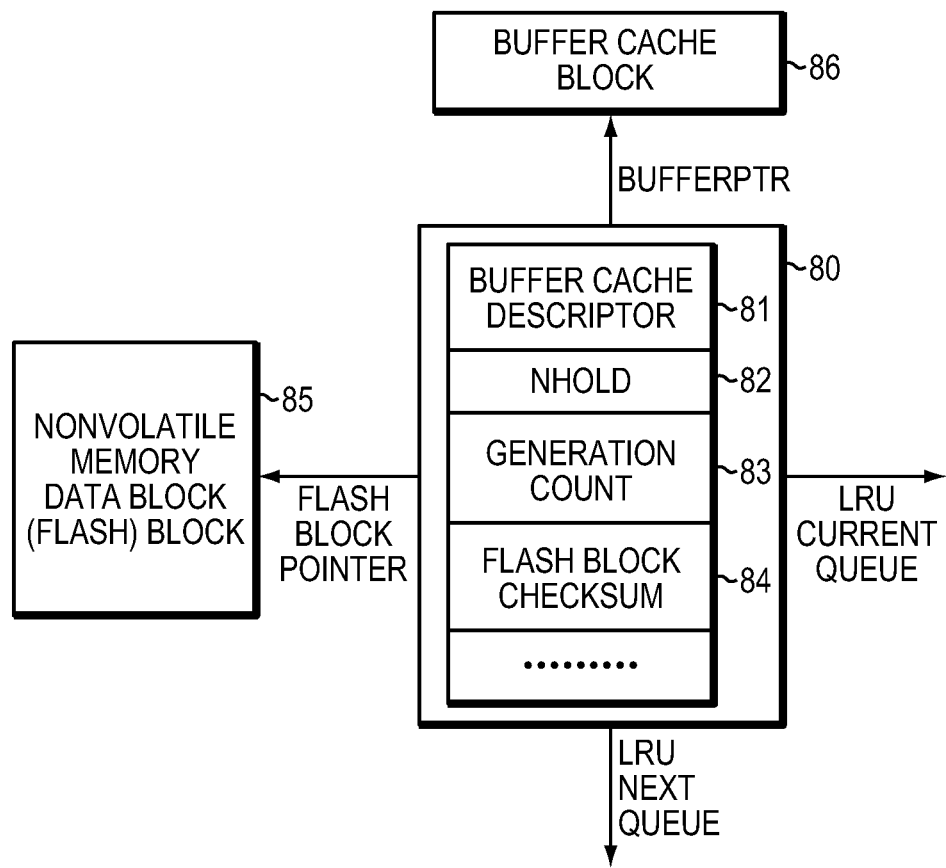
FIGS. 3-11 are block diagrams illustrating in more detail components that may be used in connection with techniques herein.

Referring to FIG. 3, shown is a block diagram of a buffer cache descriptor entry that may be included in an embodiment using the techniques described herein. In FIG. 3, the buffer cache descriptor entry 80 includes a page identifier and a current queue field. The values of the current queue field indicate whether the associated buffer cache block is in the unalloc queue 72, invalid queue 71, used queue 70, hot queue 74, or warm queue 73. Thus, the buffer cache descriptor 80 is accessed to determine if the buffer cache block associated with the buffer cache descriptor 80 is in fact available for allocation to an application. Even though a page is allocated to buffer cache pool 61, any buffer cache block that is in the invalid queue is essentially 'free' for allocation to an application for storing metadata and/or data of a file system. At initialization of operating system 40 of file server 23, all of the buffer cache descriptor links in the frame table 67 are initialized to NULL. When a page is mapped to the buffer cache pool 61, the buffer cache descriptor link for that page in the frame table 67 is updated to point to the corresponding buffer cache descriptor entry of buffer cache descriptor table 63. Further, buffer cache descriptor 80 includes nhold 82 and generation count 83 that helps label the buffer cache block 86 with a revision number for creating a hint for the buffer cache block. Additionally, buffer cache descriptor 80 includes a link to a data block 85 allocated from nonvolatile memory module 62 indicating address of the data block 85. Buffer cache descriptor 80 also includes a flash block checksum 84 for validating data block 85 when the data block 85 pointed to by the buffer cache descriptor 80 is read from the nonvolatile memory module 62. If the flash block checksum value 84 of the data block 85 is found to be invalid after reading data block 85 from nonvolatile memory 62, the generation count 83 is updated to indicate that the hint for the buffer cache block 86 is no longer valid. Referring back to FIG. 2, a total number of buffer cache descriptor entries in buffer cache descriptor table 63 is sum of a total number of buffer cache blocks created from volatile memory 59 in the buffer cache pool 61 and a total number of data blocks created from the nonvolatile memory module 62.

Figure 4:
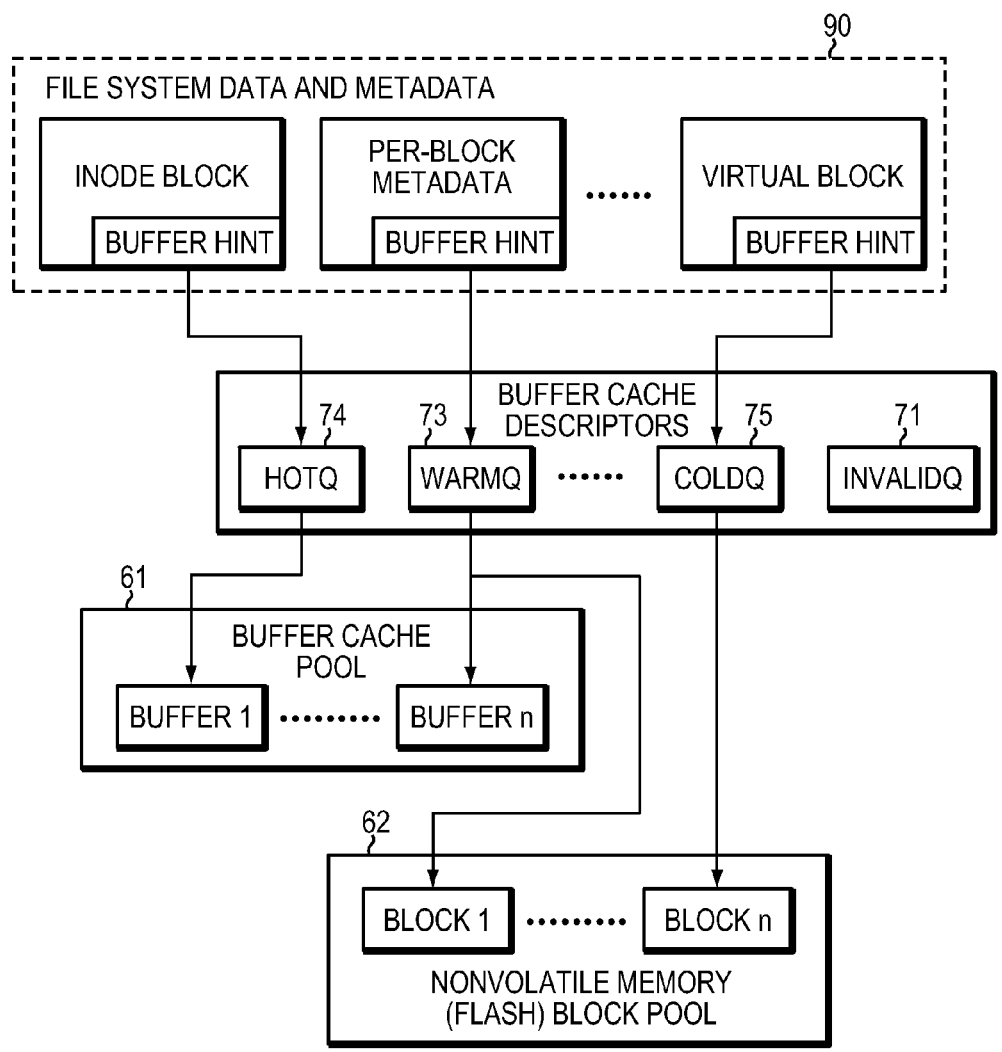

Referring to FIG. 4, shown is a detailed representation of components that may be included in an embodiment using the techniques described herein. In at least one embodiment of the current technique, metadata and/or data of a file system 90 is stored in buffer cache blocks of buffer cache pool 61. Metadata of a file system may include an inode of a file, per-block metadata for file system data blocks, and virtual block for files. Each buffer cache block is represented by a buffer cache descriptor. Further, a buffer cache descriptor associated with a buffer cache block may be included in one of the queues managed by buffer cache pool 61 (e.g., hotQ 74, warmQ 73, coldQ 75 and invalidQ 71). In at least one embodiment of the current technique, hotQ 74, warmQ 73 and coldQ 75 includes buffer cache blocks that have been used by an application for storing file system data and/or metadata 90 and then released after valid hints are created for the buffer cache blocks. Thus, the application may access data and/or metadata stored in a buffer cache block if a valid hint exists for the buffer cache block at the time the buffer cache block is accessed. Contents of a buffer cache block included in hotQ 74 may be copied to a data block of nonvolatile memory 62 in order to recycle the buffer cache block as a free buffer cache block. Even though the recycled buffer cache block is reused, contents previously stored in the recycled buffer cache block may be accessed by the application by retrieving contents from the data block of nonvolatile memory module 62 if a valid hint exists for the data block.

Figure 5:
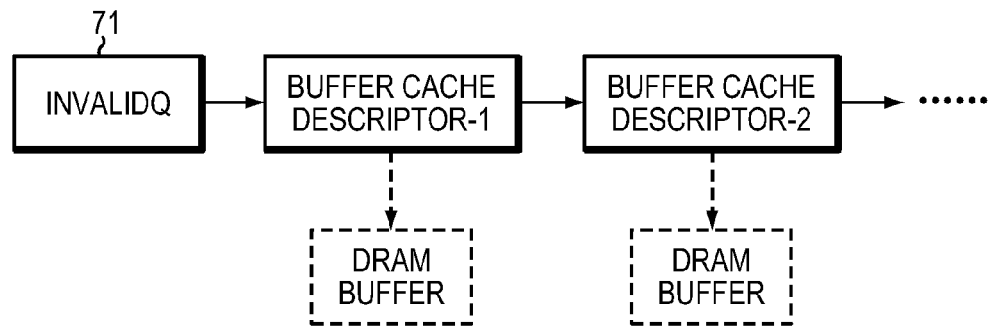

Referring to FIG. 5, shown is a block diagram of invalid queue 71 that may be included in an embodiment using the techniques described herein. Invalid queue 71 of the buffer cache pool 61 is a list that links together a set of buffer cache descriptors. Each buffer cache descriptor of the set of buffer cache descriptors points to a buffer cache block that is available for allocation to an application for storing data and/or metadata of a file system. Thus, a buffer cache block included in invalid queue 71 does not contain any valid data. Additionally, no valid hint exists for a buffer cache block included in invalid queue 71. Further, a buffer cache block associated with a buffer cache descriptor included in the invalid queue 71 is allocated from a volatile memory (e.g. Direct Random Access Memory (DRAM)) of file server 23. When operating system 40 of file server 23 initializes during a boot sequence, a portion of volatile memory 59 is apportioned into pages and all pages are assigned as buffer cache blocks to the invalid queue 71. When an application discards a buffer cache block after using the buffer cache block for storing file system metadata, the buffer cache block may be added back to invalid queue 71, and thus becomes available for further allocation to an application.

Figure 6:
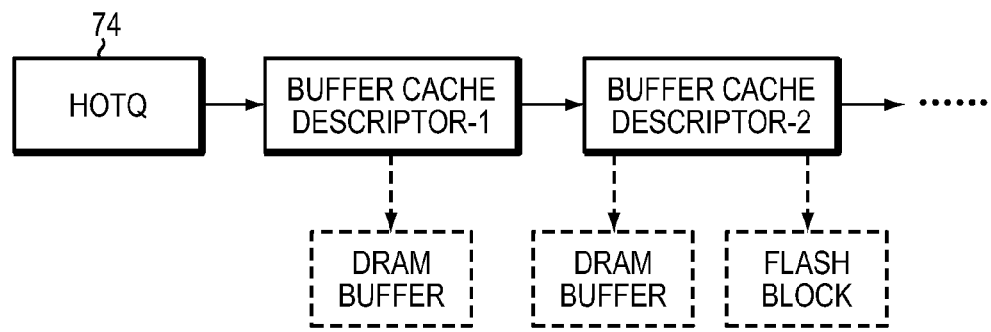

Referring to FIG. 6, shown is a block diagram of hot queue 74 that may be included in an embodiment using the techniques described herein. Hot queue 74 of the buffer cache pool 61 is a list that links together a set of buffer cache descriptors. Each buffer cache descriptor of the set of buffer cache descriptors points to a buffer cache block that has been released by an application after using the buffer cache block for storing file system data and/or metadata. Thus, a buffer cache block included in the hot queue 74 contains valid data and/or metadata, and an application may have a valid hint for the buffer cache block. Further, a buffer cache block associated with a buffer cache descriptor included in the hot queue 74 is allocated from a volatile memory (e.g. Direct Random Access Memory (DRAM)) of file server 23. However, in certain cases, a buffer cache descriptor included in the hot queue 74 may contain references to two blocks where the first block is a buffer cache block allocated from volatile memory 59 and the second block is a data block allocated from nonvolatile memory 62. Further, in such cases, contents of the two blocks pointed to by the buffer cache descriptor are identical. When operating system 40 of file server 23 initializes during a boot sequence, hot queue 71 is created as an empty queue and does not include any buffer cache descriptors. When an application is provided a buffer cache block for storing file system data and/or metadata, the application may release the buffer cache block to hot queue 74 of buffer cache pool 61 after creating a valid hint for the buffer cache block by updating the generation count and nhold fields of the buffer cache descriptor associated with the buffer cache block. A buffer cache block with a valid hint is added to hot queue 74 such that the buffer cache block may be retrieved by an application at a later time if a valid hint exists for on the buffer cache block at the time the buffer cache block is retrieved.

Figure 7:
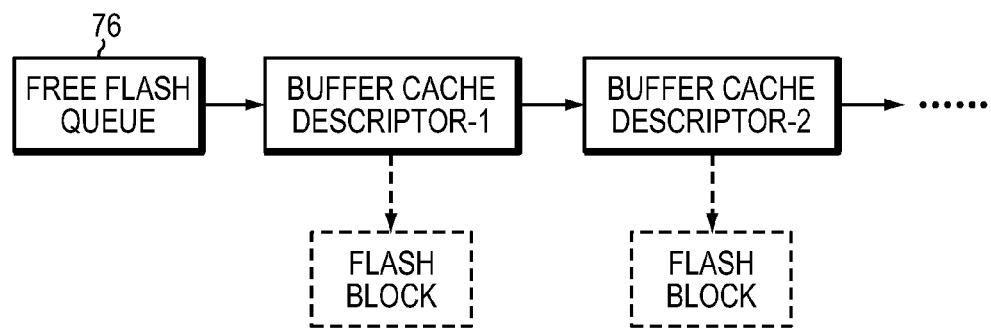

Referring to FIG. 7, shown is a block diagram of free flash queue 76 that may be included in an embodiment using the techniques described herein. Free flash queue 76 of the buffer cache pool 61 is a list that links together a set of buffer cache descriptors. Each buffer cache descriptor of the set of buffer cache descriptors points to a data block allocated from nonvolatile memory 62 (e.g. flash memory). Data blocks included in free flash queue 76 are available for storing data and/or metadata of a file system. Thus, a data block included in free flash queue 76 does not contain any valid data, and no valid hint exists for the data block. When operating system 40 of file server 23 initializes during a boot sequence, a portion of nonvolatile memory 62 is apportioned into pages and all pages are assigned as data blocks to the free flash queue 76.

Figure 8:
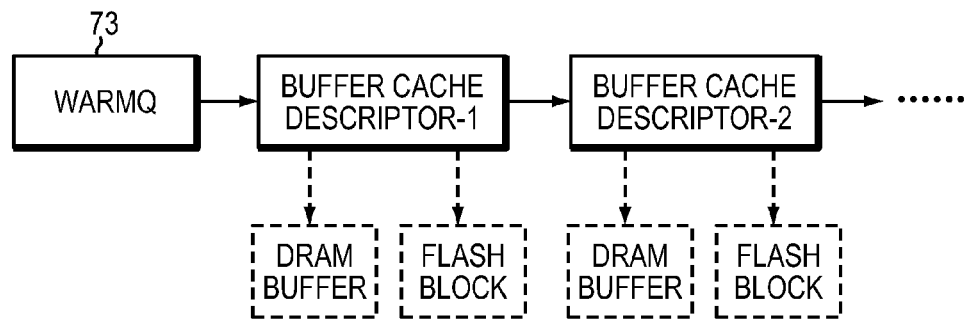

Referring to FIG. 8, shown is a block diagram of warm queue 73 that may be included in an embodiment using the techniques described herein. Warm queue 73 of the buffer cache pool 61 is a list that links together a set of buffer cache descriptors. Each buffer cache descriptor of the set of buffer cache descriptors points to two blocks where the first block is a buffer cache block allocated from volatile memory 59 and the second block is a data block allocated from nonvolatile memory 62. Further, contents of the two blocks pointed to by each buffer cache descriptor are identical. When operating system 40 of file server 23 initializes during a boot sequence, warm queue 73 is created as an empty queue and does not include any buffer cache descriptors. A buffer cache block is added to warm queue 73 when the buffer cache block is staged out from volatile memory 59 to nonvolatile memory 62 of file server 23. The process of staging out a buffer cache block is also referred to as "aging" of a buffer cache block. When an aging process is performed on a buffer cache block included in hot queue 74, contents of the buffer cache block are copied to a new data block allocated from free flash queue 76, a reference to the new data block is added to a buffer cache descriptor associated with the buffer cache block, the buffer cache descriptor is removed from the hot queue 74, and the buffer cache descriptor is added to warm queue 73. In at least one embodiment of the current technique, the aging process frees up buffer cache blocks of buffer cache pool 61 for storing additional file system metadata by copying contents of buffer cache blocks to data blocks of nonvolatile memory 62, and maintains hints created for the buffer cache blocks. Thus, a buffer cache block descriptor associated with a buffer cache block that has been aged out (or "staged out") includes two references, first to the buffer cache block and second to a data block containing contents identical to the buffer cache block. Hence, a buffer cache descriptor included in the warm queue 73 contains valid data and/or metadata, and an application may have a valid hint for the data block.

Figure 9:
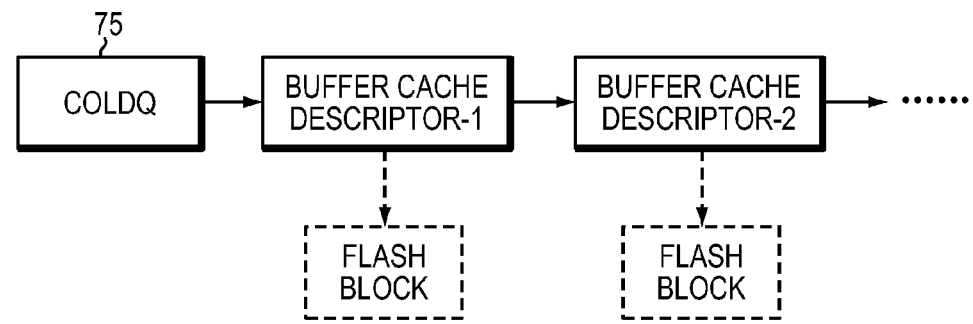

Referring to FIG. 9, shown is a block diagram of cold queue 75 that may be included in an embodiment using the techniques described herein. Cold queue 75 of the buffer cache pool 61 is a list that links together a set of buffer cache descriptors. Each buffer cache descriptor of the set of buffer cache descriptors points to a data block allocated from nonvolatile memory 62 (e.g. flash memory) that contains valid data or metadata of a file system. Thus, a valid hint may exist for a data block included in cold queue 75. When operating system 40 of file server 40 initializes during a boot sequence, cold queue 75 is created as an empty queue and does not include any buffer cache descriptors. When a buffer cache block is allocated from warm queue 73 and provided to an application for storing data and/or metadata of a file system, a buffer cache descriptor associated with the buffer cache block is split in such a way that the buffer cache block is provided to the application by removing a link to the buffer cache block from the buffer cache descriptor, and the buffer cache descriptor including a second link to a data block containing contents identical to the buffer cache block is moved from warm queue 73 to cold queue 75.

Figure 10:
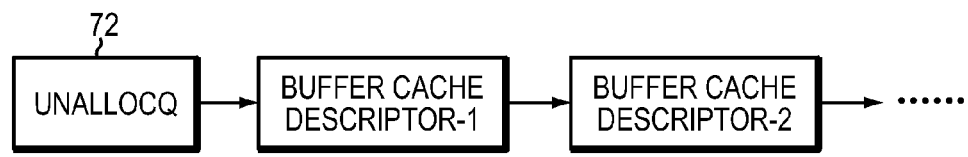

Referring to FIG. 10, shown is a block diagram of unalloc queue 72 that may be included in an embodiment using the techniques described herein. Unalloc queue 72 of the buffer cache pool 61 is a list that links together a set of buffer cache descriptors that do not point to any page (buffer cache block or nonvolatile memory data block). When operating system 40 of file server 23 initializes during a boot sequence, unalloc queue 75 is created as an empty queue and does not include any buffer cache descriptors. A buffer cache descriptor is added to the unalloc queue 72 when a buffer cache block or a data block associated with the buffer cache descriptor is reclaimed by either memory buffers management logic 55 for allocation to an application or any one of the queues of buffer cache pool 61.

In at least one embodiment of the current technique, queues of buffer cache pool 61 described above herein in FIGS. 5-10 are maintained in a least recently used manner. In a least recently used queue, a buffer cache descriptor is added to the end of the queue when a buffer cache block associated with the buffer cache descriptor is released to the queue, and a buffer cache descriptor is removed from the front of the queue when a buffer cache block associated with the buffer cache descriptor is allocated from the queue. Further, once a buffer cache block is provided to an application for storing data and/or metadata of a file system by removing the buffer cache block from a queue of buffer cache pool 61, the buffer cache block no longer appears in any of the queues of buffer cache pool 61 described above herein in FIGS. 5-10, and the buffer cache block is considered "in use" by the application.

Figure 11:
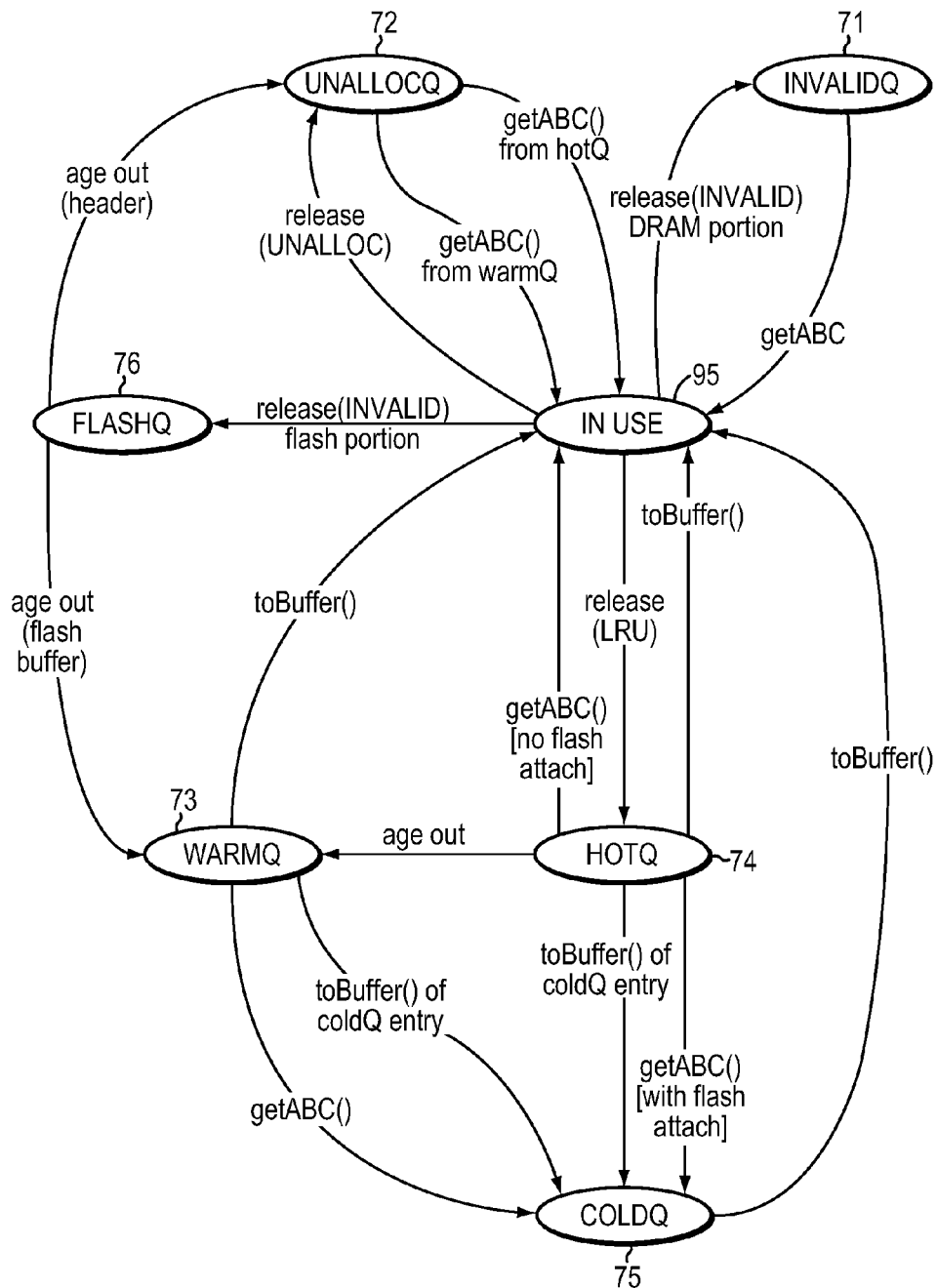

Referring to FIG. 11, shown is an illustration of life cycle of a buffer cache block in a data storage system that may be included in an embodiment using the techniques described herein. When operating system 40 of file server 23 initializes during a boot sequence, a portion of volatile memory 59 is apportioned into pages and all pages are assigned as buffer cache blocks to the invalid queue 71. When an application requests a buffer for storing data and/or metadata of a file system, a buffer cache block is removed from the invalid queue 71 and provided to the application after updating a buffer cache descriptor entry associated with the buffer cache block to indicate that the buffer cache block is in use by the application. When the application no longer requires the information stored in the buffer cache block, the application may release the buffer cache block back to the invalid queue 71 indicating that the application no longer needs to cache contents of the buffer cache block in a memory. Alternatively, the application may release the buffer cache block to the hot queue 74 indicating that the application needs to preserve (or cache) contents of the buffer cache block for an undetermined amount of time. Thus, hot queue 74 includes buffer cache blocks that have been allocated by an application, and then released by the application. The application may retrieve a buffer cache block released to the hot queue 74 at a later time, provided a valid hint exists for the buffer cache block indicating that the buffer cache block has not been recycled as a free buffer. If a valid hint exists for the buffer cache block being retrieved by the application, the buffer cache block is removed from the hot queue 74 and provided to the application for accessing previously stored data and/or metadata of the file system.

In at least one embodiment of the current technique, as more and more buffer cache blocks are allocated from invalid queue 71 and then released to hot queue 74, a total number of buffer cache blocks in hot queue 74 may exceed a predetermined threshold (also referred to as "high water mark"), which may trigger the aging process to decrease the total number of buffer cache blocks included in hot queue 74 below the predetermined threshold. The aging process removes a number of buffer cache blocks from hot queue 74 such that the total number of buffer cache blocks in hot queue 74 falls below the predetermined threshold (e.g. a low watermark value), and adds the number of buffer cache blocks to warm queue 73.

Further, the aging process may be triggered based on a time-based mechanism that indicates a time at which the aging process is invoked. Moreover, the aging process may be triggered based on the number of buffer cache block allocated to applications and released by application. It should be noted that the aging process may be triggered based on any one of the mechanism mentioned above herein or a combination thereof.

When a buffer cache block transitions from hot queue 74 to warm queue 73 as part of the aging process, a new data block is allocated from free flash queue 76, contents of the buffer cache block are copied to the new data block, a buffer cache descriptor associated with the buffer cache block is updated to include a link to the new data block, the buffer cache descriptor is removed from the hot queue 74, and added to warm queue 73. Thus, contents of the buffer cache block are duplicated to a secondary storage such as nonvolatile memory pool (e.g. flash memory) 62, when a buffer cache block is aged out from the hot queue 74. When a new data block is allocated from free flash queue 76 as part of the aging process as described above herein, a link to the new data block included in a buffer cache descriptor is removed and the buffer cache descriptor is added to unalloc queue 72 to indicate that the buffer cache descriptor no longer points to any portion of nonvolatile memory 62. The aging process preserves hints created for buffer cache blocks that are transitioned from hot queue 74 to warm queue 73. It may be possible that a buffer cache block that has been transitioned from hot queue 74 to warm queue 73 as part of the aging process is later retrieved by an application using a valid hint for the buffer cache block, and then released back to hot queue 74 after being used by the application. In such a case, when the buffer cache block is released to hot queue 74, a buffer cache descriptor associated with the buffer cache block may include a link to a data block allocated from nonvolatile memory 62 where contents of the data block and buffer cache block are identical. Thus, if a buffer cache block included in warm queue 73 includes a valid hint, the buffer cache block may be retrieved by an application at a later time to access information previously stored in the buffer cache block similar to the way a buffer cache block is retrieved from hot queue 74. Thus, buffer cache blocks included in hot queue 74 and warm queue 73 acts as a cache for storing data and/or metadata of a file system for an undetermined amount of time.

In at least one embodiment of the current technique, it may be possible that due to an excessive use of buffer cache blocks of buffer cache pool 61 by an application, no buffer cache block is left in invalid queue 71 for allocation as all buffer cache blocks may have been allocated from the invalid queue 71 by the application. In at least one embodiment of the current technique, in such a case, memory buffers management logic 55 attempts to allocate a buffer cache block from the warm queue 73. A buffer cache descriptor is removed from the warm queue 73 in the least recently used manner. The buffer cache descriptor removed from the warm queue 73 includes links to a buffer cache block (volatile memory buffer) and a data block (flash memory data block). A new buffer cache descriptor is allocated from unalloc queue 72. A link to the buffer cache block is removed from the buffer cache descriptor, the link is added to the newly allocated buffer cache descriptor entry from the unalloc queue 72, and provided to the application as a free buffer for storing data and/or metadata of a file system. Thus, the buffer cache descriptor no longer includes a link to the buffer cache block and only includes a link to the data block (e.g., flash memory data block). The buffer cache descriptor including the link to the data block is added to the cold queue 75. A hint for the data block is preserved so that if needed, an application may retrieve contents of the data block from the cold queue 75 in order to access information previously stored in the buffer cache block that has now been recycled as a free buffer.

In at least one embodiment of the current technique, it may be possible that due to an excessive use of buffer cache blocks of buffer cache pool 61, no buffer cache block is left in warm queue 73 for allocation because all buffer cache blocks of warm queue 73 may have been allocated from warm queue 73 for allocating by the application. In at least one embodiment of the current technique, in such a case, memory buffers management logic 55 attempts to allocate a buffer cache block from the hot queue 74. A buffer cache descriptor is removed from the hot queue 74 in the least recently used manner. If the buffer cache descriptor removed from the hot queue 74 includes a link to only a buffer cache block (volatile memory buffer), the buffer cache block is provided to the application, and a hint for the buffer cache block is invalidated. However, if the buffer cache descriptor removed from the hot queue 74 includes two links, first to a buffer cache block (volatile memory buffer) and second to a data block (flash memory data block), the buffer cache descriptor is processed in a similar manner as if the buffer cache block has been recycled from the warm queue 73 for allocation as described above herein.

In at least one embodiment of the current technique, an application may attempt to retrieve information (data and/or metadata of a file system) previously stored in a buffer cache block that has been staged out to cold queue 75. In such a case, a new buffer cache block is required for retrieving the information previously stored in a buffer cache block that may have been duplicated to a data block of nonvolatile memory 62 as part of the aging process. For allocating a new buffer cache block, memory buffers management logic 55 attempts to find a free buffer cache block in the invalid queue 71. If invalid queue 71 is empty, an attempt is made to find a free buffer cache block in the warm queue 73. If warm queue 73 is empty, an attempt is made to find a free buffer cache block in the hot queue 74. If a buffer cache descriptor is allocated from invalid queue 71, contents of the data block of cold queue 75 are copied to a buffer cache block associated with the buffer cache descriptor allocated from invalid queue 71, and the buffer cache block is provided to the application.

In at least one embodiment of the current technique, when a buffer cache block may transition from one queue to another queue as described above herein in FIG. 11, the buffer cache descriptor associated with the buffer cache block may acquire a nonvolatile (e.g. flash) memory data block, for example, when the buffer cache block transitions from hotQ 74 to warmQ 73. During this transition, the buffer cache block is marked as a "read only" buffer indicating that that an application may use the buffer cache block only for reading contents stored in the buffer cache block, and may not perform a write operation on the buffer cache block. Thus, if such a buffer cache descriptor including a buffer cache block and a nonvolatile memory data block is retrieved by an application and the buffer cache block is subsequently marked as "mutable" indicating that the application using the buffer cache block may perform a write operation on the buffer cache block, the nonvolatile memory data block must be invalidated because when a buffer cache descriptor includes two data blocks (buffer cache block and nonvolatile memory data block), contents of both the data blocks must remain same. If a buffer cache block is marked as "mutable", contents of the buffer cache block may be modified without making similar modifications to the nonvolatile memory data block associated with the buffer cache block. If the buffer cache block in such a case is modified, contents of the nonvolatile memory data block become stale.

Figure 12:
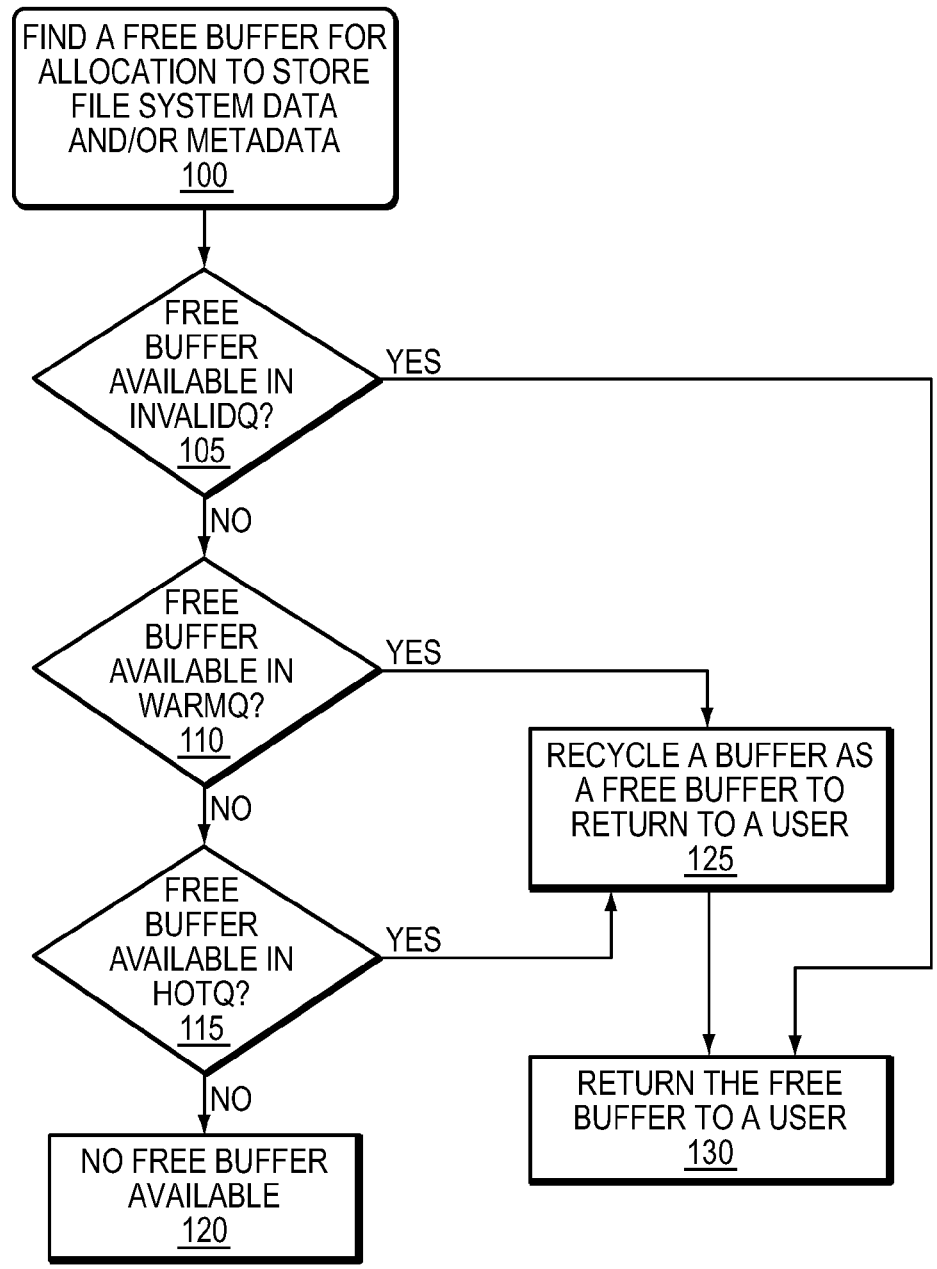
FIGS. 12-16 are flow diagrams illustrating processes that may be used in connection with techniques herein.

Referring to FIG. 12, shown is a flow diagram illustrating the method of allocating a buffer cache block for an application in a data storage system. Memory buffers management logic 55 attempts to find a free buffer for storing data and/or metadata of a file system upon receiving a request by an application (step 100). With reference also to FIGS. 2 and 11, memory buffers management logic 55 checks invalid queue 71 to determine whether invalid queue 71 contains a buffer cache block that may be available for allocation (step 105). If invalid queue 71 contains one or more available buffer cache descriptors, a buffer cache descriptor is removed from invalid queue 71 in the least recently used manner. A buffer cache block associated with the buffer cache descriptor is provided to the application for storing data and/or metadata of the file system (step 130). If invalid queue 71 does not contain any buffer cache descriptors, memory buffers management logic 55 checks warm queue 73 to determine whether warm queue 73 contains a free buffer cache block that may be available for allocation. If warm queue 73 contains one or more buffer cache descriptors, a buffer cache descriptor is removed from warm queue 73 in the least recently used manner (step 110). A buffer cache block associated with the buffer cache descriptor is provided to the application after recycling the buffer cache block as a free buffer (step 125). If warm queue 73 does not contain any buffer cache descriptors, memory buffers management logic 55 checks hot queue 74 to determine whether hot queue 74 contains a free buffer cache block that may be available for allocation (step 115). If hot queue 74 contains one or more buffer cache descriptors, a buffer cache descriptor is removed from hot queue 74 in the least recently used manner. A buffer cache block associated with the buffer cache descriptor is provided to the application after recycling the buffer cache block as a free buffer (step 125).

Figure 13:
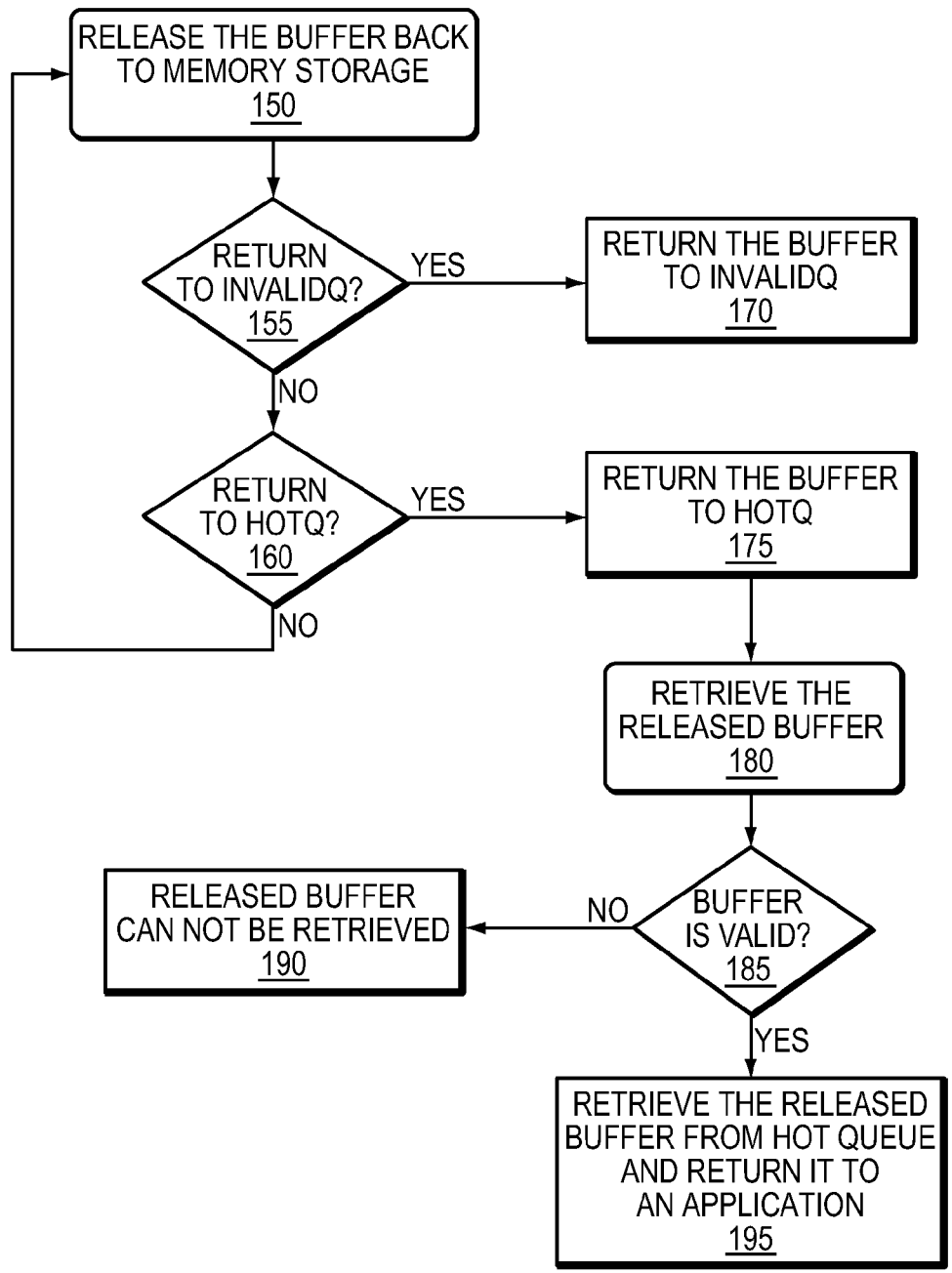

Referring to FIG. 13, shown is a flow diagram illustrating the method of releasing a buffer cache block in a data storage system. In at least one embodiment of the current technique, when an application no longer requires information stored in a buffer cache block, the application may release the buffer cache block to a queue of buffer cache pool 61 (step 150). If the application releases the buffer cache block to invalid queue 71 (step 155), a buffer cache descriptor associated with the buffer cache block is added to the invalid queue in the least recently used manner (step 170). In such a case, the application can not retrieve information stored in the buffer cache block that has been released to the invalid queue 71 because once a buffer cache block is added to the invalid queue 71, the buffer cache block becomes available as a free buffer. However, if in step 170, the buffer cache block descriptor also includes a reference to a nonvolatile memory data block, the buffer cache block associated with the buffer cache descriptor is released to the invalid queue 71 as described above herein. However, the nonvolatile memory data block in such a case is released to the free flash queue 76 by allocating a buffer cache descriptor from unalloc queue 72, associating the allocated buffer cache descriptor to the nonvolatile memory data block, and adding the nonvolatile memory block to free flash queue 76 in the least recently used manner. If the application releases the buffer cache block to hot queue 74 (step 160), a buffer cache descriptor associated with the buffer cache block is added to the hot queue 74 in the least recently used manner (step 175). In such a case, the application may retrieve information stored in the buffer cache block that has been released to the hot queue 74, if the hint created for the buffer cache block is valid at the time the application attempts to access the buffer cache block (step 180). If the hint is valid for the buffer cache block that has been released to the hot queue 74, the buffer cache block is provided to the application, and the buffer cache descriptor associated with the buffer cache block is removed form the hot queue 74 indicating that the buffer cache block is in use by the application (step 195). Thus, in at least one embodiment of the current technique, hot queue 74 may serve as a cache for an application that may store data and/or metadata of a file system in the cache, and retrieve the data and/or metadata of the file system from the cache at a later time. If the hint is not valid for the buffer cache block that has been released to the hot queue 74, the buffer cache block may no longer be retrieved by the application because an invalid hint indicates that the buffer cache block no longer contains valid information. (step 190).

Figure 14:
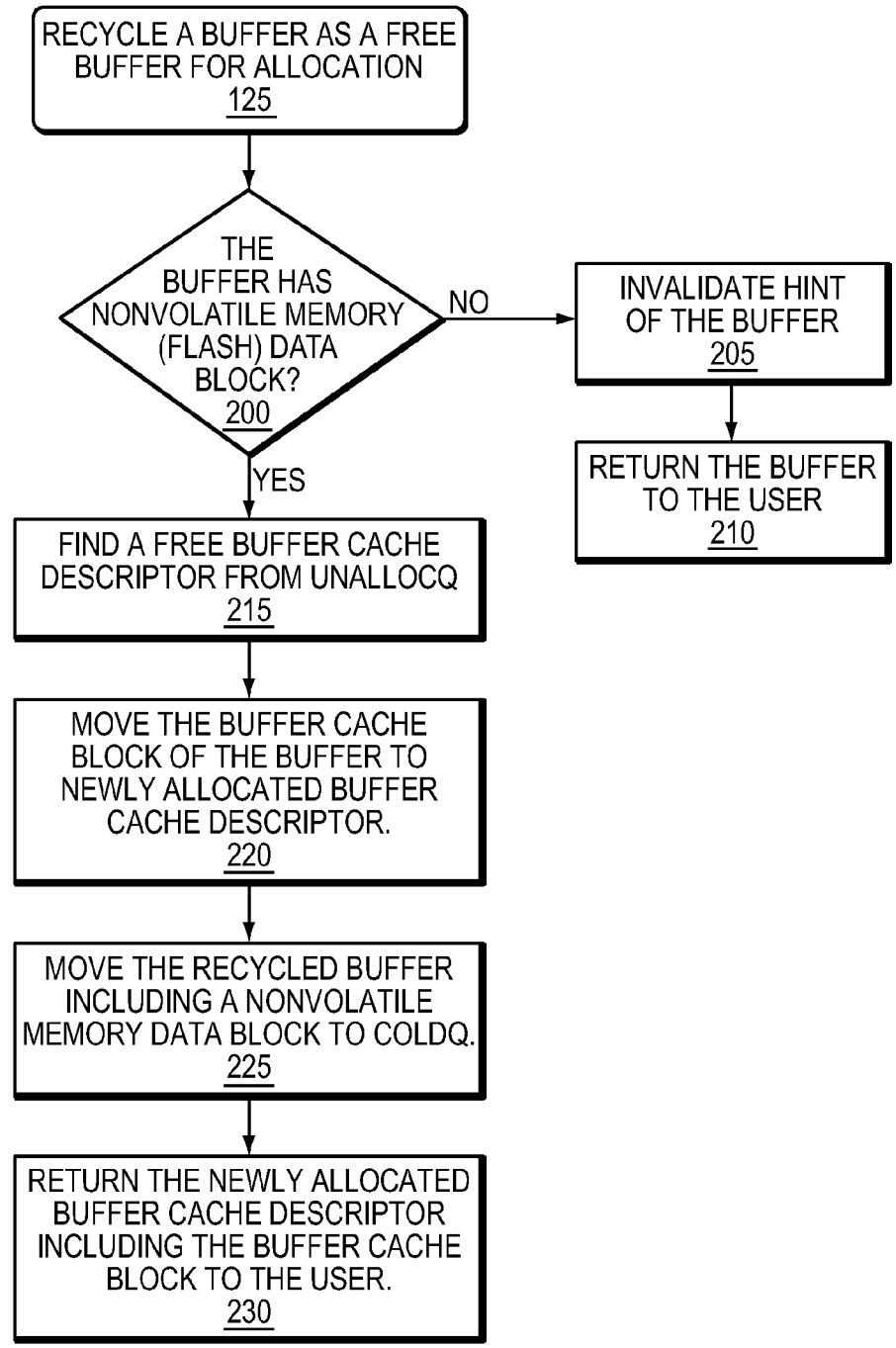

Referring to FIG. 14, shown is a flow diagram illustrating the method of recycling a buffer cache block as a free buffer when the buffer cache block is allocated from warm queue 73 or hot queue 74 in a data storage system. If memory buffers management logic 55 fails to allocate a buffer cache block from invalid queue 71, a buffer cache block may be allocated from warm queue 73 or hot queue 74. However, in such a case, a buffer cache block allocated from warm queue 73 or hot queue 74 must be recycled as a free buffer before the buffer cache block is allocated to an application as a free buffer because contents stored in the buffer cache block may be valid, and an application may have a valid hint for the buffer cache block (step 125). If a buffer cache block that is being recycled as a free buffer is allocated from hot queue 74, memory buffers management logic 55 determines whether a buffer cache descriptor associated with the buffer cache block includes a link to a data block of nonvolatile memory 62 (200). If the buffer cache descriptor does not include a link to a data block of nonvolatile memory 62, the buffer cache descriptor is updated to indicate that the hint for the buffer cache block is no longer valid (step 205). Then, the buffer cache block is allocated and provided to the application as a free buffer (step 210). However, if the buffer cache descriptor includes a link to a data block of nonvolatile memory 62, the buffer cache block is recycled in the same manner as if a buffer cache block that is allocated from warm queue 73 is recycled.

If a buffer cache block that is being recycled as a free buffer is allocated from warm queue 73, a buffer cache descriptor associated with the buffer cache block also includes a link to a data block of nonvolatile memory 62. In order to split the buffer cache block from the data block, a new buffer cache descriptor is allocated from unalloc queue 72 (step 215). The buffer cache block is associated with the newly allocated buffer cache descriptor by removing the link to the buffer cache block from the buffer cache descriptor, and adding the link to newly allocated buffer cache descriptor (step 220). Hence, the buffer cache block is split from the buffer cache descriptor of warm queue 73. As a result, the buffer cache descriptor is left with only a link to the data block of nonvolatile memory 62. The buffer cache descriptor is moved from warm queue 73 to cold queue 75 (step 225). A hint for the buffer cache descriptor remains valid in order to enable the application to retrieve the information stored in the data block at a later time. The newly allocated buffer cache descriptor including a link to the buffer cache block that has been recycled is provided to the application as a free buffer (step 230).

Figure 15:
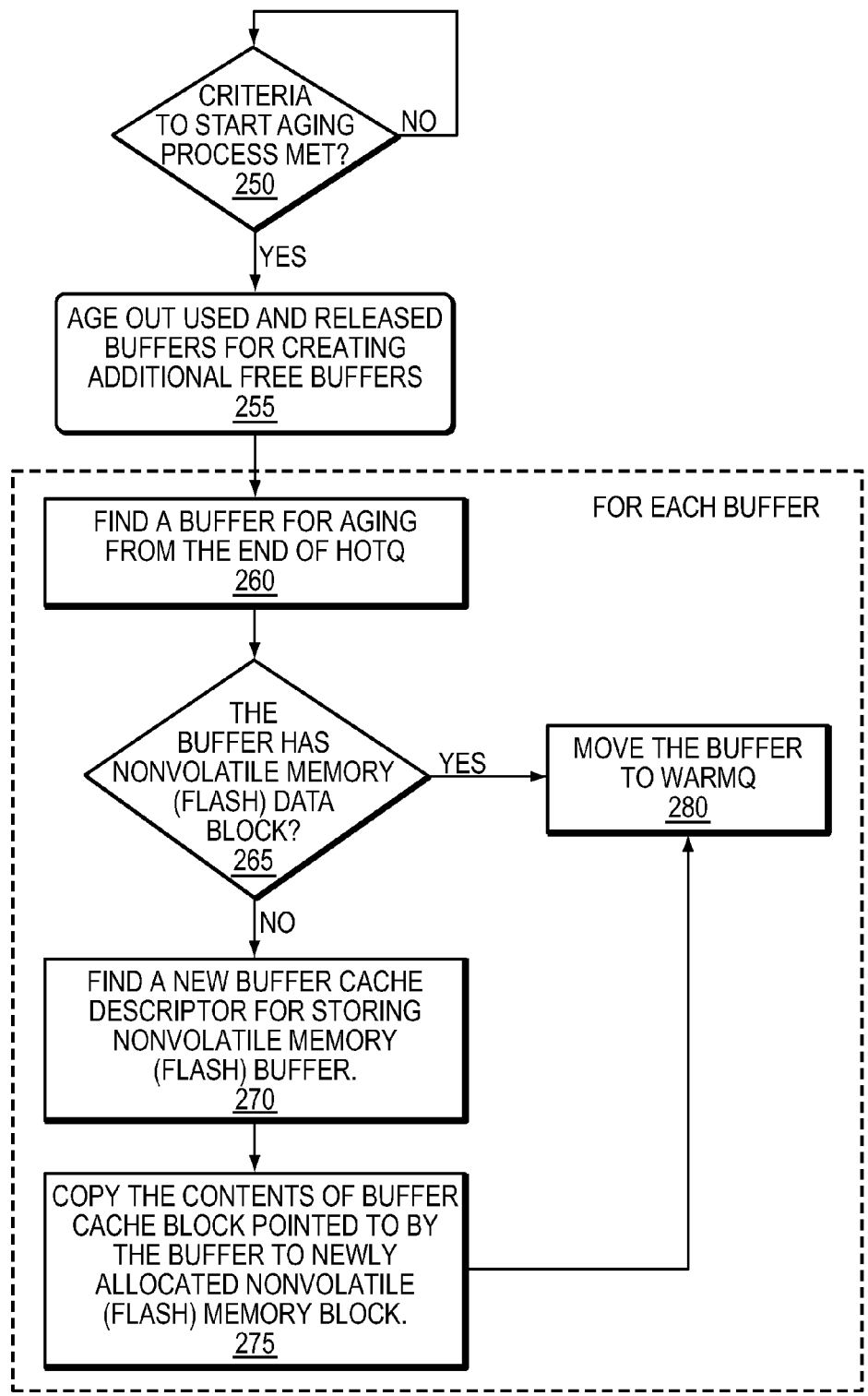

Referring to FIG. 15, shown is a flow diagram illustrating the method of aging a number of buffer cache blocks from hot queue 74 in a data storage system. The aging process reclaims a set of buffer cache blocks from a queue (e.g. hot queue 74) of buffer cache pool 61. An application may use a buffer cache block for storing data and/or metadata of a file system, and then release the buffer cache block to hot queue 74 after creating a valid hint for the buffer cache block. The buffer cache block, in such a case, is marked as a dirty buffer, and may be retrieved by the application at a later time. However, when the application frequently releases buffer cache blocks to hot queue 74, the length of the hot queue may exceed the predetermined threshold value.

Memory buffers management logic 55 uses the aging process in such a case to efficiently manage the size of hot queue 74. The aging process is invoked based on a specific criteria. In at least one embodiment, the specific criteria may be based on the length of a queue in such a way that the aging process may be invoked when the length of a queue exceeds the predetermined threshold value. In another embodiment, the specific criteria may be based on a predetermined time interval in such a way that the aging process may be invoked periodically at the predefined time intervals. Memory buffers management logic 55 starts the aging process based on the specific criteria (step 250). Based on the specific criteria, the aging process starts aging out a set of buffer cache blocks that have been used, and released to hot queue 74 by an application (step 255). For each buffer cache block selected for aging by the aging process (step 260), memory buffers management logic 55 checks if a buffer cache descriptor associated with a buffer cache block selected for aging includes a link to a data block of nonvolatile memory 62 (step 265). If the buffer cache descriptor includes a link to a data block of nonvolatile memory 62, the buffer cache descriptor is moved from hot queue 74 to warm queue 73 (step 280). However, if the buffer cache descriptor does not include a link to a data block of nonvolatile memory 62, contents of the buffer cache block must be duplicated to a data block of nonvolatile memory 62. In such a case, a new buffer cache descriptor is allocated from free flash queue 76 or preempted from cold queue 75 (step 270). Contents of the buffer cache block are copied to a data block of nonvolatile memory 62 associated with the newly allocated buffer cache descriptor (step 275). The buffer cache descriptor is updated to include a link to the data block of nonvolatile memory 62, and the newly allocated buffer cache descriptor is updated to remove the link to the data block of nonvolatile memory 62. The buffer cache descriptor including links to the buffer cache page and data block of nonvolatile memory 62 is moved from hot queue 74 to warm queue 73 (step 280). The newly allocated buffer cache descriptor is moved to unalloc queue 72.

Figure 16:
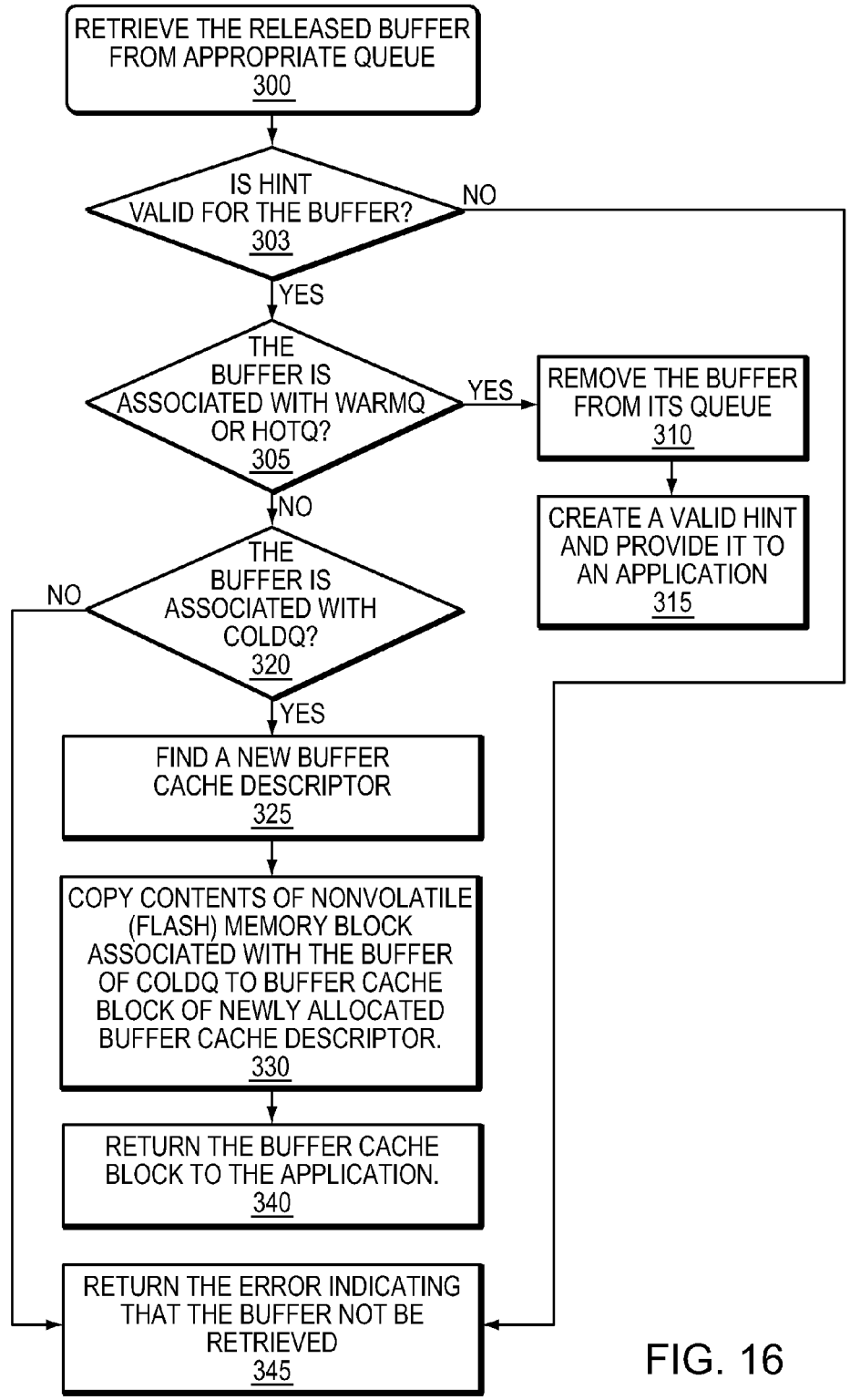

Referring to FIG. 16, shown is a flow diagram illustrating the method of retrieving a buffer cache block that has been released by an application in a data storage system. In at least one embodiment of the current technique, an application may allocate a buffer cache block for storing data and/or metadata of a file system, create a valid hint for the buffer cache block, release the buffer cache block to buffer cache pool 61, and then attempt to access information stored in the buffer cache by using the hint (step 300). Memory buffers management logic 55 determines whether a valid hint exists for the buffer cache block (step 303). If the hint for the buffer cache block is no longer valid, an error is returned to the application indicating that the information may not be retrieved (step 345). However, if the hint is valid, and the application attempts to access the information stored in the buffer cache, memory buffers management logic 55 determines whether a buffer cache descriptor associated with the buffer cache belongs to warm queue 73 or hot queue 74 (step 305). If the buffer cache descriptor belongs to hot queue 74 or warm queue 73, the buffer cache descriptor is removed from the queue it belongs to (step 310). The hint for the buffer cache block is preserved, and the buffer cache block is provided to the application (step 315). If the buffer cache descriptor belongs to warm queue 73, the buffer cache descriptor also includes a link to a data block of nonvolatile memory 62 that contains contents identical to the buffer cache block, and includes a valid hint for the data block. If the buffer cache descriptor belongs to cold queue 75, the buffer cache descriptor only includes a link to a data block of nonvolatile memory 62 which indicates that the buffer cache block has been aged out to nonvolatile memory 62. In such a case, in order to provide information to the application, the information is retrieved from nonvolatile memory 62 to buffer cache pool 61. Thus, a new buffer cache block is allocated (step 325). The new buffer cache block may be allocated from invalid queue 71 in the least recently used manner. If invalid queue 71 is empty, the new buffer cache block may be allocated from warm queue 73 in the least recently used manner. If warm queue 73 is empty, the new buffer cache block may be allocated from hot queue 74 in the least recently used manner. Contents of the data block associated with the buffer cache descriptor of cold queue 75 are copied to the newly allocated buffer cache block (step 330). The newly allocated buffer cache block is provided to the application (step 335). If the buffer cache descriptor does not belong to cold queue 75, an error is returned to the application indicating that the information may not be retrieved (step 340).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in enhancing memory buffering by using secondary storage, the method comprising:
    supplementing a buffer cache pool with a secondary storage, wherein a portion of a volatile memory of a data storage system is reserved as the buffer cache pool, wherein the buffer cache pool includes a set of buffer cache objects for storing file system data and metadata, wherein the secondary storage includes a set of data blocks;
aging out a first buffer cache object of the set of buffer cache objects by copying contents of the buffer cache object to a data block of the secondary storage; and
retrieving contents of the first buffer cache object from the secondary storage by copying contents of the data block of the secondary storage to a second buffer cache object of the set of buffer cache objects of the buffer cache pool.

2. The method of claim 1, wherein the secondary storage includes a flash memory, wherein the flash memory is apportioned into the set of data blocks.

3. The method of claim 1, wherein the buffer cache pool includes a buffer cache descriptor table for storing availability information for each buffer cache object of the set of buffer cache objects, wherein the buffer cache descriptor table includes a set of buffer cache descriptor entries, wherein a buffer cache descriptor entry of the set of buffer cache descriptor entries is associated with a buffer cache object of the set of buffer cache objects, wherein a buffer cache descriptor entry of the set of buffer cache descriptor entries is associated with a data block of the set of data blocks of the secondary storage.

4. The method of claim 1, wherein the buffer cache pool includes an invalid queue, an unalloc queue, a warm queue, a hot queue, a cold queue and a free flash queue.

5. The method of claim 4, wherein aging out a buffer cache object further comprising:
determining, whether a buffer cache descriptor associated with the buffer cache object is associated with a data block of the secondary storage;
based on the determination, allocating a new data block from the secondary storage and copying contents of the buffer cache object to the new data block of the secondary storage, wherein the new data block is associated with the buffer cache descriptor; and
moving the buffer cache descriptor from the hot queue to the warm queue, wherein contents of the buffer cache object are identical to contents of the new data block.

6. The method of claim 4, wherein the hot queue includes a set of buffer cache descriptors linked in a least recently used manner, wherein a buffer cache descriptor of the set of buffer cache descriptors is associated with a buffer cache object of the buffer cache pool and a data block of the secondary storage, wherein the data block is associated with the buffer cache descriptor upon aging out of the buffer cache descriptor.

7. The method of claim 4, wherein the cold queue includes a set of buffer cache descriptors linked in a least recently used manner, wherein a buffer cache descriptor of the set of buffer cache descriptors is associated with a data block of the secondary storage.

8. The method of claim 4, further comprising:
identifying a buffer cache object from the buffer cache pool for allocation;
determining a queue associated with the buffer cache object;
based on the determination, recycling the buffer cache object; and
allocating the buffer cache object for storing file system data and metadata.

9. The method of claim 8, wherein recycling a buffer cache object further comprising:
determining, whether a buffer cache descriptor associated with the buffer cache object is associated with a data block of the secondary storage;
based on the determination, moving the data block to the cold queue; and
based on the determination, invalidating a hint for the buffer cache object.

10. The method of claim 4, wherein retrieving contents of a buffer cache object from the secondary storage further comprising:
determining, based on whether a hint for the buffer cache object is valid, whether to retrieve contents of the buffer cache object;
based on the determination, identifying a queue associated with the buffer cache object; and
based on the identification, allocating a new buffer cache descriptor, copying contents of the data block associated with the buffer cache object to a new buffer cache object associated with the new buffer cache descriptor, and providing the new buffer cache object to an application.

11. A system for use in enhancing memory buffering by using secondary storage, the system comprising a processor configured to:
supplement a buffer cache pool with a secondary storage, wherein a portion of a volatile memory of a data storage system is reserved as the buffer cache pool, wherein the buffer cache pool includes a set of buffer cache objects for storing file system data and metadata, wherein the secondary storage includes a set of data blocks;
age out a first buffer cache object of the set of buffer cache objects by copying contents of the buffer cache object to a data block of the secondary storage; and
retrieve contents of the first buffer cache object from the secondary storage by copying contents of the data block of the secondary storage to a second buffer cache object of the set of buffer cache objects of the buffer cache pool.

12. The system of claim 11, wherein the secondary storage includes a flash memory, wherein the flash memory is apportioned into the set of data blocks.

13. The system of claim 11, wherein the buffer cache pool includes a buffer cache descriptor table for storing availability information for each buffer cache object of the set of buffer cache objects, wherein the buffer cache descriptor table includes a set of buffer cache descriptor entries, wherein a buffer cache descriptor entry of the set of buffer cache descriptor entries is associated with a buffer cache object of the set of buffer cache objects, wherein a buffer cache descriptor entry of the set of buffer cache descriptor entries is associated with a data block of the set of data blocks of the secondary storage.

14. The system of claim 11, wherein the buffer cache pool includes an invalid queue, an unalloc queue, a warm queue, a hot queue, a cold queue and a free flash queue.

15. The system of claim 14, wherein aging out a buffer cache object further comprising:
determine, whether a buffer cache descriptor associated with the buffer cache object is associated with a data block of the secondary storage;
allocate, based on the determination, a new data block from the secondary storage and copying contents of the buffer cache object to the new data block of the secondary storage, wherein the new data block is associated with the buffer cache descriptor; and
move the buffer cache descriptor from the hot queue to the warm queue, wherein contents of the buffer cache object are identical to contents of the new data block.

16. The system of claim 14, wherein the hot queue includes a set of buffer cache descriptors linked in a least recently used manner, wherein a buffer cache descriptor of the set of buffer cache descriptors is associated with a buffer cache object of the buffer cache pool and a data block of the secondary storage, wherein the data block is associated with the buffer cache descriptor upon aging out of the buffer cache descriptor.

17. The system of claim 14, wherein the cold queue includes a set of buffer cache descriptors linked in a least recently used manner, wherein a buffer cache descriptor of the set of buffer cache descriptors is associated with a data block of the secondary storage.

18. The system of claim 14, further comprising:
   identify a buffer cache object from the buffer cache pool for allocation;
   determine a queue associated with the buffer cache object;
   recycle, based on the determination, the buffer cache object; and
   allocate the buffer cache object for storing file system data and metadata.

19. The system of claim 18, wherein recycling a buffer cache object further comprising:
   determine, whether a buffer cache descriptor associated with the buffer cache object is associated with a data block of the secondary storage;
   move, based on the determination, the data block to the cold queue; and
   invalidate, based on the determination, a hint for the buffer cache object.

20. The system of claim 14, wherein retrieving contents of a buffer cache object from the secondary storage further comprising:
   determine, based on whether a hint for the buffer cache object is valid, whether to retrieve contents of the buffer cache object;
   identify, based on the determination, a queue associated with the buffer cache object; and
   allocate, based on the identification, a new buffer cache descriptor, copying contents of the data block associated with the buffer cache object to a new buffer cache object associated with the new buffer cache descriptor, and providing the new buffer cache object to an application.

\* \* \* \* \*